United States Patent

Lee

(10) Patent No.: US 10,530,158 B2
(45) Date of Patent: Jan. 7, 2020

(54) CONTROL DEVICE FOR STATIC VAR COMPENSATOR AND CONTROL METHOD THEREOF

(71) Applicant: LSIS CO., LTD., Anyang-si, Gyeonggi-do (KR)

(72) Inventor: Seung Hun Lee, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 56 days.

(21) Appl. No.: 15/461,373

(22) Filed: Mar. 16, 2017

(65) Prior Publication Data

US 2017/0317497 A1 Nov. 2, 2017

(30) Foreign Application Priority Data

Apr. 28, 2016 (KR) .................. 10-2016-0052276

(51) Int. Cl.
*H02J 3/18* (2006.01)
*G05B 23/02* (2006.01)

(52) U.S. Cl.
CPC ........ *H02J 3/1828* (2013.01); *G05B 23/0291* (2013.01); *H02J 3/1835* (2013.01); *Y02E 40/12* (2013.01); *Y02E 40/30* (2013.01)

(58) Field of Classification Search
CPC .. H02J 3/1828; H02J 3/1835; G05B 23/0291; Y02E 40/12; Y02E 40/30
USPC ........................................................ 700/293
See application file for complete search history.

(56) References Cited

U.S. PATENT DOCUMENTS

| 4,106,085 A |   | 8/1978  | Demarest et al. |
|-------------|---|---------|------------------|
| 4,307,331 A | * | 12/1981 | Gyugyi ................. H02J 3/1864 323/210 |
| 4,599,553 A |   | 7/1986  | Brennen et al. |
| 5,227,713 A | * | 7/1993  | Bowler ..................... G05F 1/20 307/102 |
| 5,684,465 A |   | 11/1997 | Andersson et al. |
| 8,314,596 B2|   | 11/2012 | Thorvaldsson et al. |

(Continued)

FOREIGN PATENT DOCUMENTS

| CN | 1048829 C    | 1/2000 |
|----|--------------|--------|
| CN | 1016210203 A | 1/2010 |

(Continued)

OTHER PUBLICATIONS

Japanese Office Action for related Japanese Application No. 2017-000386; action dated Mar. 13, 2018; (6 pages).

(Continued)

*Primary Examiner* — Kenneth M Lo
*Assistant Examiner* — Michael W Choi
(74) *Attorney, Agent, or Firm* — K&L Gates LLP

(57) ABSTRACT

A control device for a static var compensator (SVC) includes: a monitoring control unit configured to generate an error presence/absence signal based on a control signal inputted from a system controller; a valve signal processing unit configured to generate a valve state signal based on databack signals respectively inputted from a plurality of valves; a CPU control unit configured to generate a state information signal based on the error presence/absence signal and the valve state signal; and a firing signal output control unit configured to generate a firing signal according to the state information signal.

16 Claims, 7 Drawing Sheets

(56) References Cited

U.S. PATENT DOCUMENTS

| | | | |
|---|---|---|---|
| 2010/0001698 A1* | 1/2010 | Johnson | H02J 3/1864 323/209 |
| 2010/0038907 A1 | 2/2010 | Hunt et al. | |
| 2014/0049866 A1* | 2/2014 | Reiter | H03K 17/0828 361/86 |
| 2015/0333650 A1 | 11/2015 | Park | |
| 2015/0333651 A1 | 11/2015 | Park et al. | |
| 2016/0276819 A1* | 9/2016 | Kreuter | H02H 1/0007 |
| 2017/0317497 A1 | 11/2017 | Lee | |

FOREIGN PATENT DOCUMENTS

| | | |
|---|---|---|
| CN | 101707352 A | 5/2010 |
| CN | 102119256 A | 7/2011 |
| CN | 103348257 A | 10/2013 |
| CN | 204424912 | 6/2015 |
| EP | 0858141 | 12/2009 |
| EP | 3240166 A1 | 11/2017 |
| JP | S59172928 A | 9/1984 |
| JP | H05040912 U | 6/1993 |
| JP | H06138964 | 5/1994 |
| JP | H07255130 A | 10/1995 |
| JP | 2001112175 A | 4/2001 |
| JP | 2013258140 A | 12/2013 |
| JP | 5441786 | 3/2014 |
| JP | 2014093808 A | 5/2014 |
| JP | 2015220993 A | 12/2015 |
| JP | 2015220994 A | 12/2015 |
| KR | 20030073788 | 9/2003 |
| KR | 101127430 | 3/2012 |
| KR | 101567345 | 11/2015 |
| KR | 101568154 | 11/2015 |
| WO | 9406028 | 3/1994 |
| WO | 9630994 | 10/1996 |
| WO | 2013000499 | 1/2013 |

OTHER PUBLICATIONS

European Patent Office Application Serial No. 16202406.1, Search Report dated Feb. 28, 2017, 11 pages.

Chinese Search Report for related Chinese Application No. 201710011232.0; report dated Jan. 6, 2017; (3 pages).

Chinese Office Action for related Chinese Application No. 201710011232.0; report dated Mar. 1, 2019; (7 pages).

* cited by examiner

| S6 OUTPUT SIGNAL | S5 OUTPUT SIGNAL | S8 |
|---|---|---|
| 0 | 0 | MAINTAINING |
| 1 | 0 | 1 |
| 0 | 1 | 0 |
| 1 | 1 | MAINTAINING |

CONTROL DEVICE FOR STATIC VAR COMPENSATOR AND CONTROL METHOD THEREOF

CROSS-REFERENCE TO RELATED APPLICATIONS

Pursuant to 35 U.S.C. § 119(a), this application claims benefit of earlier filing date and right of priority to Korean Patent Application No. 10-2016-0052276, filed on Apr. 28, 2016, the contents of which are all hereby incorporated by reference in its entirety.

BACKGROUND

The present invention relates to a control device for a static var compensator (SVC) and a control method thereof, and in particular, to a control device for a SVC which is applied to high voltage direct current (HVDC) power transmission.

The HVDC power transmission refers to a power transmission method in which a power transmitter converts AC power generated by a power generator into DC power and transmits the DC power, and a power receiver converts the DC power back into AC power and supplies the AC power to customers.

The SVC is a device for compensating for reactive power which is lost during electric power transmission and distribution to enhance stability of power transmission and also is a system for removing limitations, such as power loss in an AC system, by applying power conversion technology of a thyristor of an existing current-type HVDC system.

The SVC is used as core facilities of power companies, steel companies, or flexible AC transmission systems (FACTS). The FACTS supplies power stably even when the generation quantity of renewable energy, such as wind energy or solar energy, is rapidly changed, thus minimizing power transmission loss, efficiently using existing power networks, and also maintaining system stability.

A valve destruction interface of the SVC generates a final firing signal by adding a firing signal transmitted by an upper controller to a databack signal received from a gate unit and transmits the final firing signal to the gate unit. However, there may be much difficulty in system configuration since the types and number of databack signals significantly increase depending on various conditions which may occur during valve management. Also, when an error occurs due to unstable environments, considerable time and manpower are required to deal with and process the error.

For example, an existing system for compensating for reactive power receives pieces of data from lower systems and checks an error by calculating the pieces of data. Specifically, the existing system determines an error in a thyristor, an error in conducting information, an error in gamma operation information, and an error in break-over diode (BOD) information, based on the pieces of received data, and when it is determined that there is no error with respect to all the information, informs that there is no error in data information by outputting a firing signal.

In particular, the primary purpose of the existing system is to check and control a state of a valve from a time point at which the firing signal is started.

Therefore, there is much difficulty in system configuration since the types and number of databack signals significantly increase depending on various conditions which may occur during management.

Also, when an error occurs due to unstable environments, considerable time and manpower are required to deal with and process the error. In particular, since a period is set to 16.67 ms with respect to the firing signal, there are limitations in simultaneously controlling gate units in the entire system. Furthermore, there is a problem in which, although a control operation related to a corresponding line during one period is completed, a subsequent sequence can proceed only when a control operation related to another line is completed.

Also, there is complexity in signal transmission to transmit a signal to a valve through a control and protection (C&P) of the upper controller.

SUMMARY

The purpose of the present invention is to facilitate transmission and reception of signals between a control device and valves in an SVC.

In one embodiment, a control device for a static var compensator (SVC) includes: a monitoring control unit configured to generate an error presence/absence signal based on a control signal inputted from a system controller; a valve signal processing unit configured to generate a valve state signal based on databack signals respectively inputted from a plurality of valves; a CPU control unit configured to generate a state information signal based on the error presence/absence signal and the valve state signal; and a firing signal output control unit configured to generate a firing signal according to the state information signal.

The state information signal may include information about a normal state or an abnormal state.

The monitoring control unit may periodically initialize the error presence/absence signal.

The control device may further include a controller configured to correct an error, and the controller may be a central processing unit (CPU).

The control signal may be inputted from the system controller in a set period. The monitoring control unit may output an error presence signal of the error presence/absence signal to the CPU control unit when the control signal is not inputted in the set period.

The minoring control unit may check the number of occurrences of an error in the set period and information about a line where the error occurs.

The CPU control unit may transmit a normal-state information signal to the firing signal output control unit when the state information signal indicates a normal state.

The CPU control unit may transmit an abnormal-state information signal to the controller when the state information indicates an abnormal state.

The controller may generate an error correction signal resulting from error correction based on the abnormal-state information signal and transmit the generated error correction signal to the CPU control unit.

The CPU control unit may generate the normal-state information signal in response to the error correction signal and transmit the generated normal-state information signal to the firing signal output control unit.

The control device may further include a sub-module interface configured to transmit the databack signals respectively inputted from the plurality of valves to the valve signal processing unit and transmit a firing signal generated by the output control unit to the plurality of valves individually.

In another embodiment, a control method of a control device for a static var compensator (SVC), includes: generating an error presence/absence signal based on a control signal inputted from a system controller; generating a valve state signal based on databack signals respectively inputted from a plurality of valves; generating a state information signal based on the error presence/absence signal and the valve state signal; and generating a firing signal according to the state information signal.

The generating of the state information signal may include: when the state information signal indicates a normal state, transmitting a normal-state information signal to a firing signal output control unit; and when the state information signal indicates an abnormal state, transmitting an abnormal-state information signal to a controller.

The generating of the state information signal may further include generating an error correction signal resulting from error correction based on the abnormal-state information signal and transmitting the error correction signal to a CPU control unit.

The generating of the state information may further include generating a normal-state information signal in response to the error correction signal and transmitting the generated normal-state information signal to the firing signal output control unit.

DETAILED DESCRIPTION OF THE EMBODIMENTS

Figure 1:
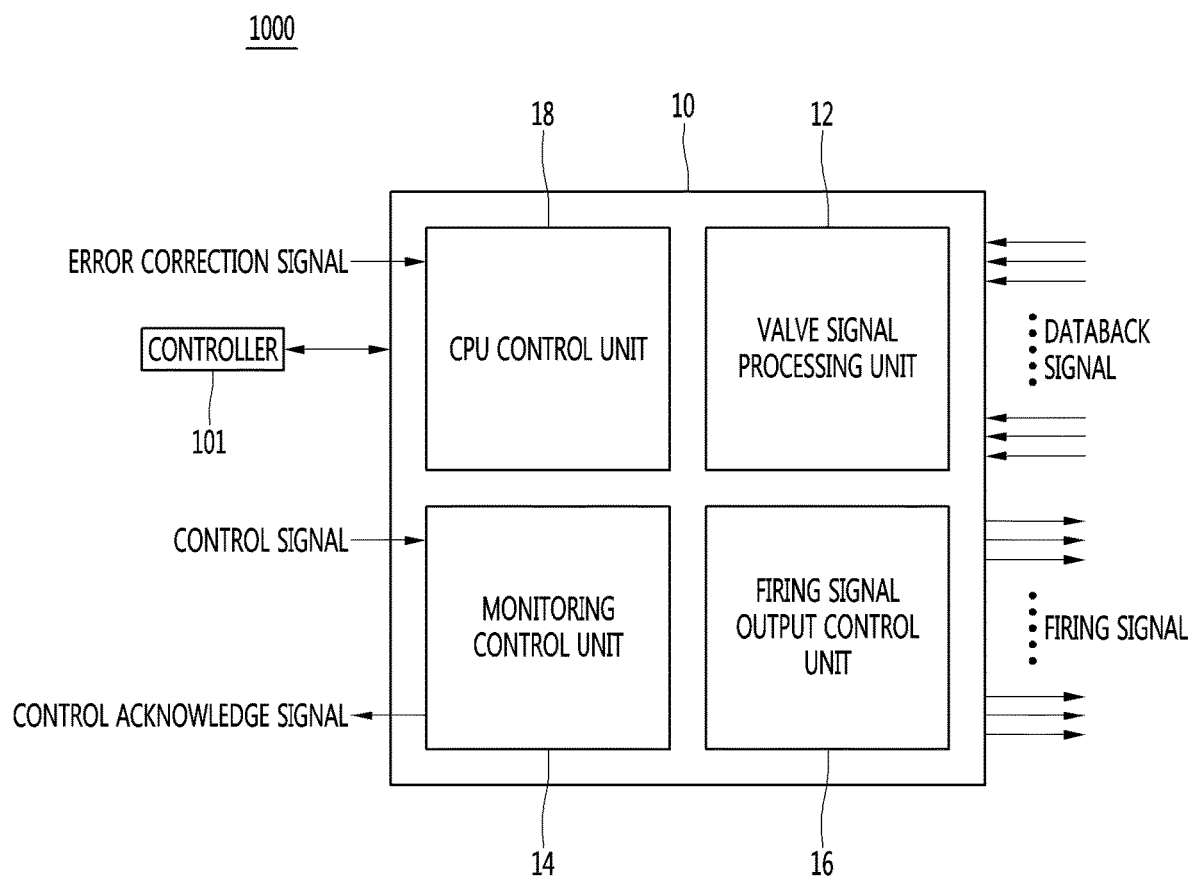
FIG. 1 illustrates a structure of a distributed controller which is a controller for a static var compensator (SVC) according to an embodiment of the present disclosure.

FIG. 1 illustrates a structure of a distributed controller which is a controller of an SVC according to an embodiment of the present invention.

FIG. 1 is a diagram for describing a structure a valve destruction interface (VDI) applied to the SVC according to an embodiment of the present invention.

Referring to FIG. 1, the VDI of the SVC may be a part of valve based electronics (VBE) equipment for controlling valves.

Figure 2:
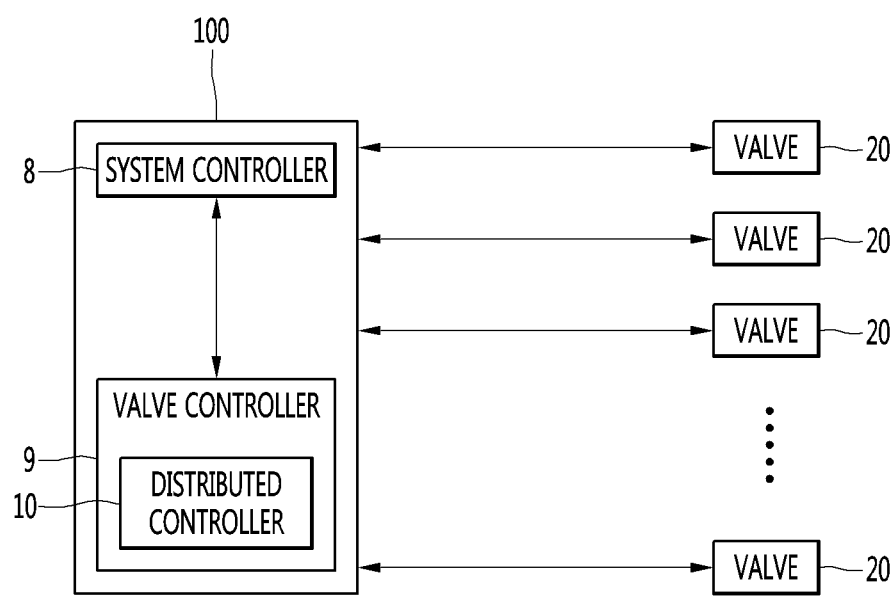
FIG. 2 is a diagram for describing transmission and reception of signals between a distributed controller included in a upper controller or the upper controller and a plurality of valves, according to an embodiment of the present disclosure.

FIG. 2 is a diagram for describing transmission and reception of signals between the distributed controller included in an upper controller or the upper controller and a plurality of valves, according to an embodiment of the present invention.

FIG. 2 is a diagram for describing transmission of signals to the VDI applied to the SVC according to an embodiment of the present invention. The upper controller 100 may include valve based electronics (VBE) and control and protection (C&P).

The VBE may include the VDI.

The VDI may be a part of the VBE equipment for controlling valves and the VDI may control the plurality of valves 20 in a distributed manner.

In the following description, the VDI may be referred to as a distributed controller 10, the VBE may be referred to as a valve controller 9, and the C&P is referred to as a system controller 8.

The upper controller 100 may include the valve controller 9 and the system controller 8 and the valve controller 9 may include the distributed controller 10.

Referring to FIGS. 1 and 2, a control device 1000 of an SVC may include the distributed controller 10 and a controller 101.

The distributed controller 10 includes a monitoring control unit 14 configured to receive a control signal from the system controller 8 and generate an error presence/absence signal and a valve signal processing unit 12 configured to receive a databack signal from each of the plurality of valves 20 and generate a valve state signal.

Also, the distributed controller 10 may include a CPU control unit 18 configured to output at least one of a normal-state information signal and an abnormal-state information signal based on the error presence/absence signal and the valve state signal and a firing signal output control unit 16 configured to receive the normal-state information signal when the state information signal indicates a normal state and transmit a firing signal to each of the plurality of valves 20.

When the abnormal-state information signal is generated based on the error presence/obscene signal and the valve state signal, the CPU control unit 18 may transmit the abnormal-state information signal to the controller 101.

When the abnormal-state information signal is received, the controller 101 may solve an abnormal state-related problem in response to the abnormal-state information signal and transmit an error correction signal to the CPU control unit 18.

When the error correction signal is received, the CPU control unit 18 may transmit the normal-state information signal to the firing signal output control unit 16. Thereafter, the firing signal output control unit 16 may transmit the firing signal to each of the plurality of valves 20.

The monitoring control unit 14 may initialize the error presence/obscene signal in every period, and when the control signal is not received within a set period, output an error presence signal of error presence and absence signals.

The CPU control unit 18 may receive the error presence signal of the error presence and absence signals and transmit the error presence signal to the controller 101.

The monitoring control unit 14 may check the number of occurrences of error within the set period and information about a line in which an error occurs.

The line in which an error occurs may correspond to a databack signal and the monitoring control unit 14 may know a position of the line in which the error occurs through the corresponding databack signal.

The set period may be a period in which the monitoring control unit 14 receives the control signal from the system controller 8.

Every period may be a period in which one period is repeated, and may be preferably set to 16.67 ms.

The distributed controller 10 included in the control device 1000 of the SVC will be described below. Specifically, the distributed controller 10 may include a valve signal processing unit 12, a monitoring control unit 14, a firing signal output control unit 16, and a CPU control unit 18.

The valve signal processing unit 12 may analyze databack signals received from the plurality of valves 20 and output valve state signals.

Each of the databack signals may be a signal including current state information of each of the plurality of valves 20.

Each of the plurality of valves 20 may be configured in such a way that a plurality of thyristors (not illustrated) are connected in series to one another and the plurality of thyristors may include gate units respectively.

The valve signal processing unit 12 may receive and process databack signals from the plurality of valves 20 respectively to check the states of the plurality of valves 20 and analyze the databack signals received from the valves 20 and output valve state signals.

The valve signal processing unit 12 may receive a databack signal from at least one of the plurality of valves 20. Specifically, the valve signal processing unit 12 may receive the databack signal through lines respectively connected to the plurality of valves 20. The connected line may be a wired line or a wireless line.

The monitoring control unit 14 may receive a control signal from the system controller 8 of the upper controller 100 and transmit, to the system controller 8, a control acknowledge signal that is an acknowledge signal for the control signal received from the system controller 8. The control signal may be a signal of turning on/off the plurality of valves 20.

The monitoring control unit 14 may receive the control signal from the system controller 8 of the upper controller 100, generate an error presence/absence signal, and transmit the error presence/absence signal to the CPU control unit 18.

The CPU control unit 18 may control a central processing unit (CPU) and the CPU control unit 18 may combine all signals input to the distributed controller 10 and transmit a state information signal to the CPU and the firing signal output control unit 16.

The CPU control unit 18 may combine the valve state signal received from the valve signal processing unit 12 and the error presence/absence signal received from the monitoring control unit 14 and output the state information signal. When the state information signal indicates a normal state, a normal-state information signal is transmitted to the firing signal output control unit 16 and when the state information signal indicates an abnormal state, an abnormal-state information signal is transmitted to the controller 101.

When the normal-state information signal is received, the firing signal output control unit 16 may output a firing signal to each of the valves 20 in response to the normal-state information signal. Each of the valves 20 may be fired in response to the firing signal.

When a situation, such as a specific event, an error, a valve fault, or the like, occurs in the plurality of valves 20, the CPU control unit 18 may determine that an abnormal state is verified and transmit an abnormal-state information signal to the controller 101.

The CPU control unit 18 may solve a problem related to the abnormal-state information signal through the controller 101. When the problem related to the abnormal-state information signal is solved, the controller 101 may transmit an error correction signal to the CPU control unit 18. The controller 101 may be a CPU.

The controller 101 may be included in the CPU control unit 18 or may be a separate device, but is not limited thereto.

When the error correction signal is received, the CPU control unit 18 may transmit a normal-state information signal to the firing signal output control unit 16.

When the problem related to the abnormal-state information signal is solved through the controller 101, the CPU control unit 18 may transmit a normal-state information signal to the firing signal output control unit 16.

When the normal-state information signal is received, the firing signal output control unit 16 may output a firing signal.

The state information signal may be a signal indicating the states of the plurality of valves 20. When at least one of the plurality of valves 20 is malfunctioned, damaged, or blocked, the CPU control unit 18 may generate an abnormal-state information signal and transmit the abnormal-state information signal to the controller 101. When the plurality of valves 20 are in a normal state, the CPU control unit 18 may generate a normal-state information signal and transmit the normal-state information signal to the firing signal output control unit 16.

The firing signal output control unit 16 may transmit the firing signal that is an operation instruction to the plurality of valves 20 individually. The firing signal may be a turn on signal of each of the valves 20.

When the firing signal is transmitted to the plurality of valves 20, the distributed controller 10 may directly transmit the firing signal to the plurality of valves 20 through the firing signal output control unit 16 of the distributed controller 10 without passing through the system controller 8, thus rapidly performing the firing of the plurality of valves 20 and simplifying a signal processing method.

When the firing signal is transmitted to the plurality of valves 20, the control device 1000 of the SVC may directly transmit the firing signal to the plurality of valves 20 through the firing signal output control unit 16 without passing through the system controller 8, thus rapidly performing the firing of the plurality of valves 20 and simplifying a signal processing method.

That is, when the firing signal is transmitted to the plurality of valves 20, the distributed controller 10 may transmit the firing signal to the plurality of valves 20 through the firing signal output control unit 16 of VDI (Valve Destruction Interface) without passing through C&C (Control & Protection) of the upper controller 100, thus rapidly turning on or off the plurality of valves 20 and thus making a signal processing method simplified.

The distributed controller 10 may receive only databack signals through the valve signal processing unit 12 and recognize the states of the plurality of valves 20 through the databack signals.

Referring back to FIG. 2, the upper controller 100 may include the valve controller 9 and the system controller 8, and the valve controller 9 may include the distributed controller 10.

The databack signals from the plurality of valves 20 may be transmitted to the upper controller 100. Specifically, the databack signals may be transmitted to the system controller 8 of the upper controller 100 and the distributed controller 10 of the valve controller 9.

The system controller 8 may transmit a control signal to the valve controller 9. Alternatively, the system controller 8 may directly transmit the control signal to the distributed controller 10 without passing through the valve controller 9.

The distributed controller 10 may combine the control signal and the databack signal and output a state information signal. When the state information signal indicates a normal state, the distributed controller 10 transmits a firing signal to the plurality of valves 20 respectively, and when the state information signal indicates an abnormal state, the controller 101 may transmit an abnormal-state information signal to the controller 101. The controller 101 grapes a relevant problem based on the abnormal-state information signal, and solves the problem. Thereafter, the controller 101 may transmit an error correction signal to the distributed controller 10.

When the error correction signal is received from the controller 101, the distributed controller 10 may generate a firing signal in response to the error correction signal and transmit the firing signal to the plurality of valves 20 respectively.

Specifically, the plurality of valves 20 may respectively a databack signal to the valve signal processing unit 12 of the distributed controller 10.

The system controller 8 may transmit a control signal to the monitoring control unit 14 of the distributed controller 10.

The CPU control unit 18 of the distributed controller may combine the control signal received by the monitoring control unit 14 with the databack signal received by the valve signal processing unit 12 to output a state information signal. When the state information signal indicates a normal state, the firing signal output control unit 16 may receive a normal-state information signal from the CPU control unit 18 and transmit a firing signal to the plurality of valves 20 in response to the state information signal. When the state information signal indicates an abnormal state, the CPU control unit 18 may transmit an abnormal-state information signal to the controller 101.

The controller 101 may solve a problem related to the abnormal-state information signal and transmit an error correction signal to the CPU control unit 18 of the distributed controller 10. The controller 101 may be a central processing unit (CPU).

When the error correction signal is received from the controller 101, the CPU control unit 18 of the distributed controller 10 may generate the normal-state information signal and transmit the normal-state information signal to the firing signal output control unit 16. The firing signal output control unit 16 may generate a firing signal and transmit the firing signal to the plurality of the valves 20 in response to the normal-state information signal.

Figure 3:
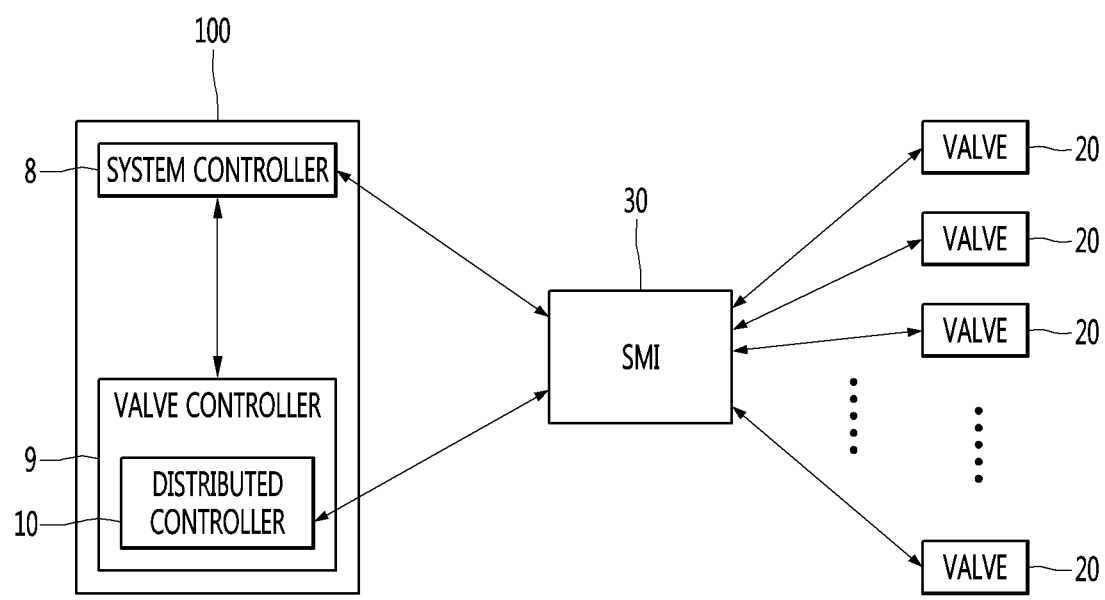
FIG. 3 is a diagram for describing transmission and reception of signals among a distributed controller included in a upper controller or the upper controller, a sub-module interface, and a plurality of valves, according to an embodiment of the present disclosure.

FIG. 3 is a diagram for describing transmission and reception of signals among a distributed controller included in an upper controller or the upper controller, a sub-module interface, and a plurality of valves, according to the present invention.

FIG. 3 is a diagram for describing transmission and reception of signals among a valve destruction interface (VDI) applied to the SVC according to an embodiment of the present invention, the sub-module interface (SMI), and the plurality of valves.

Referring to FIG. 3, the upper controller 100 may include the valve controller 9 and the system controller 8 and the valve controller 9 may include the distributed controller 10.

Each of the plurality of valves 20 may transmit a databack signal to the sub-module interface 30. The sub-module interface 30 may transmit the databack signals respectively received from the plurality of valves 20 to the upper controller 100. The sub-module interface 30 may transmit a signal received from the upper controller 100 to the plurality of valves 20 respectively.

Specifically, the plurality of valves 20 may respectively transmit the databack signals to the sub-module interface 30 and the sub-module interface 30 may transmit the databack signals respectively received from the plurality of valves 20 to the system controller 8 and the valve controller 9.

The sub-module interface 30 may transmit the databack signals respectively received from the plurality of valves 20 to the distributed controller 10 of the valve controller 9.

The sub-module interface 30 may transmit a firing signal received from the upper controller 100 to the plurality of valves 20 respectively.

The system controller 8 may transmit the control signal to the distributed controller 10.

The distributed controller 10 may combine the control signal of the system controller 8 with the databack signals of the plurality of valves 20 to output a state information signal. When the state information signal indicates a normal state, the distributed controller 10 may transmit a firing signal to the sub-module interface 30, and the sub-module interface 30 may transmit the firing signal to the plurality of valves 20 respectively. Also, when the state information signal indicates an abnormal state, the distributed controller 10 may transmit an abnormal-state information signal to the controller 101.

The controller 101 may solve a problem related to the abnormal-state information signal and transmit an error correction signal to the distributed controller 10.

When the error correction signal is received, the distributed controller 10 may transmit a firing signal to the sub-module interface 30, and the sub-module interface 30 may receive and transmit the firing signal to the plurality of valves 20 respectively.

Figures 4A, 4B:
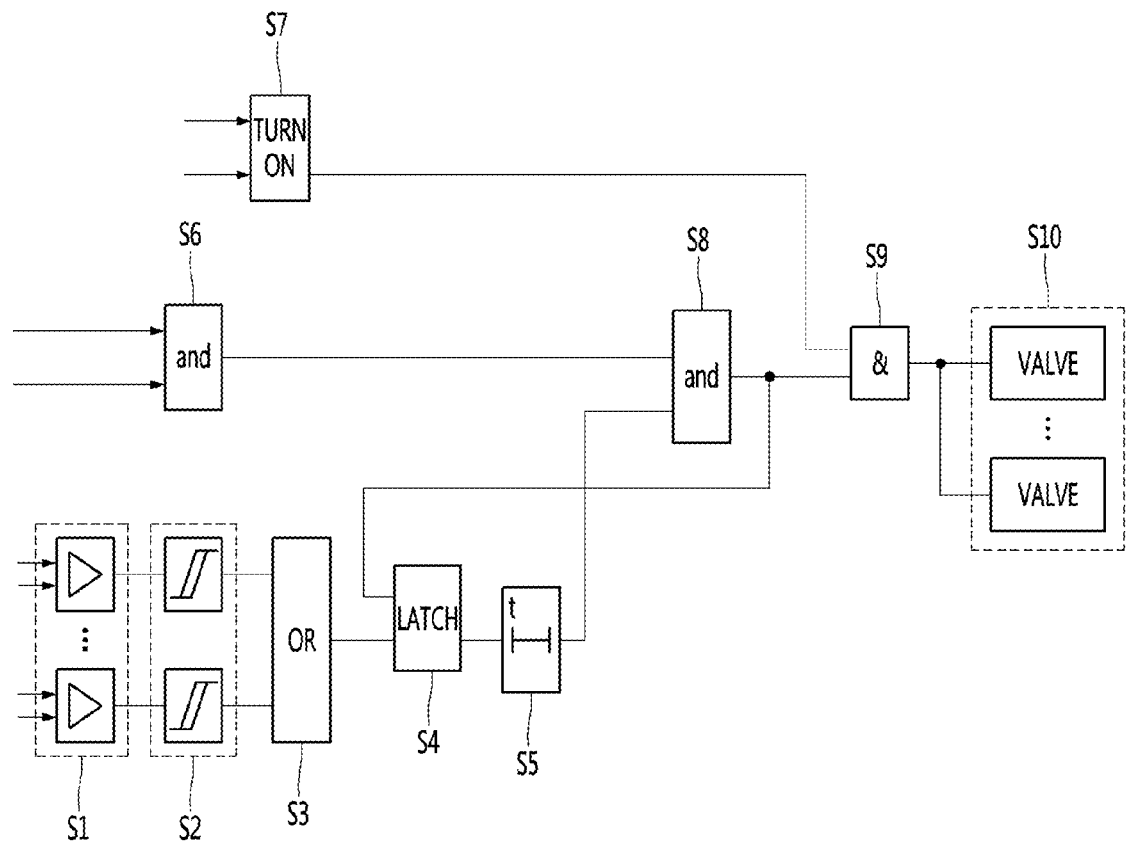
FIG. 4A is a diagram for output of a firing signal of a distributed controller, according an embodiment of the present disclosure.
FIG. 4B is a table representing an output signal of S5, S6 and S8 according to an embodiment of the present disclosure.

FIG. 4A is a diagram for output of a firing signal of a distributed controller, according to an embodiment of the present invention, FIG. 4B is a table representing an output signal of S5, S6 and S8.

FIG. 4A is a diagram illustrating output of a firing signal of a distributed controller 10 corresponding to a VDI which is applied to the SVC according to an embodiment of the present invention.

Referring to FIGS. 4A and 4B, the distributed controller 10 may receive databack signals from the plurality of valves 20 respectively (S1).

The databack signals received from the plurality of valves 20 may be converted into digital signals by a digital converter (not illustrated) of the distributed controller 10 (S2).

Each of the digital signals may be subjected to a logical sum (OR) operation (S3) through the distributed controller 10, and the logical sum signal which is a signal resulted from the OR operation may be transmitted to a latch. The latch may receive the OR signal and a feedback signal (S4). The feedback signal may be a second logical product signal which is generated earlier than a current second logical product signal to be described below.

The latch may be an operational element for temporarily holding or storing a digital signal.

A delay signal may be generated by delaying the OR signal and the feedback signal (S5), and the CPU control unit 18 may receive the delay signal.

The distributed controller 10 may receive a control signal from the system controller 8 (S6) and also receive a duplex control signal from the system controller 8 (S7).

The control signal of the system controller 8 may be subjected to a first logical product (AND) operation and be output, and the distributed controller 10 may receive a first AND signal resulting from the first AND operation.

The distributed controller 10 may determine whether a normal state is verified by performing a second AND operation between the delay signal inputted from S5 the first AND signal inputted from S6 (S8). When 1 (High) is output as a result of the second AND operation, it may be determined that a normal state is verified, and when 0 (Low) is output, it may be determined that an abnormal state is verified. Alternatively, when 0 (Low) is output, it may be determined that a normal state is verified, and when 1 (High) is output, it may be determined that an abnormal state is verified. When it is determined that a normal state is verified, the second AND signal may be output.

The duplex control signal may be a control signal of another system controller different from the system controller 8, and the duplex control signal may be formed of signals of valves which are turned on, among the plurality of valves 20.

A third AND operation may be performed on the second AND signal and the duplex control signal of the system controller and in this way, comparison with a state of another system controller may be performed (S9).

The distributed controller 10 may determine whether a normal state is verified through the second AND operation between the delay signal and the first AND signal, and when it is determined that the normal state is verified, generate and output the second AND signal (S8).

The distributed controller 10 may change the second AND signal into a firing signal, thus performing the firing of the plurality of valves 20 by using the firing signal (S10).

Turing on the plurality of valves 20 may mean that the firing of the plurality of valves 20 is done and turning off the plurality of valves 20 may mean that the firing of the plurality of valves 20 is not done.

FIG. 5 is a diagram for describing a relationship between a signal transmitted by a controller of an SVC and a voltage and a current generated in a plurality of valves, according to an embodiment of the present invention.

FIG. 5 is a diagram for describing a signal input to a distributed controller 10 applied to an SVC, according to an embodiment of the present invention.

Figure 5A:
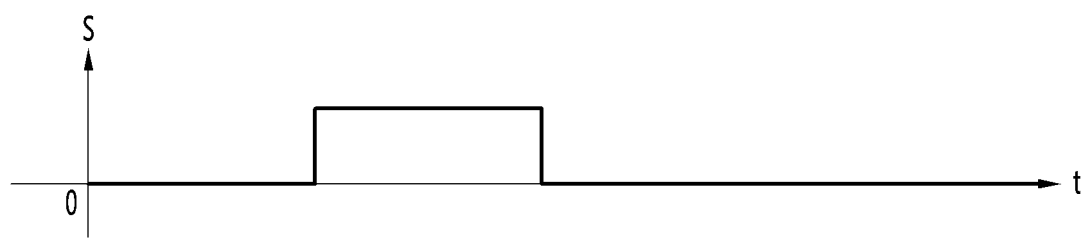
FIG. 5A is a diagram illustrating an output of a databack signal in one of a plurality of valves according to an embodiment of the present disclosure.

FIG. 5A is a diagram illustrating an output of a databack signal in one of a plurality of valves 20, in which a horizontal axis indicates time (t) and a vertical axis indicates the output of the databack signal (s).

When being turned off, each of the plurality of valves may output a databack signal and directly transmit the databack signal to the upper controller 100, or may transmit the databack signal to the upper controller 100 through the sub-module interface 30.

Figure 5B:
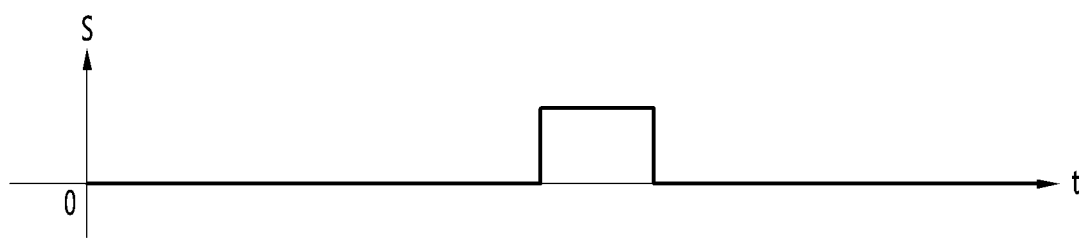
FIG. 5B is a diagram illustrating a control signal output from the system controller according to an embodiment of the present disclosure.

FIG. 5B may be a diagram illustrating a control signal output from the system controller 8 of the upper controller 100, in which a horizontal axis indicates time (t) and a vertical axis indicates a signal (s) of the control signal.

The control signal of the system controller 8 may be transmitted to the distributed controller 10 and the distributed controller 10 may receive the control signal and transmit a firing signal to the plurality of valves 20.

Figure 5C:
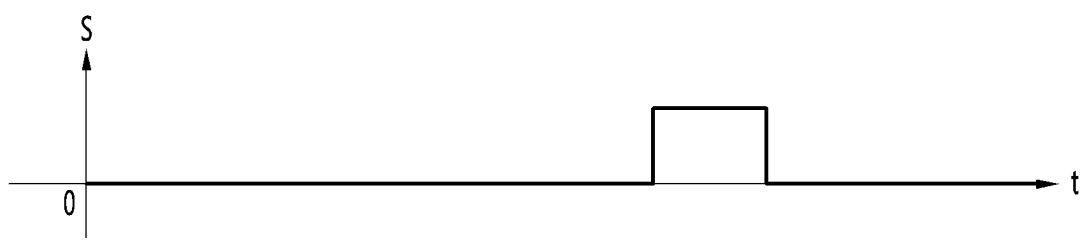
FIG. 5C is a diagram illustrating reception of the firing signal in the plurality of valves according to an embodiment of the present disclosure.

FIG. 5C may be a diagram illustrating reception of the firing signal in the plurality of valves 20 in which a horizontal axis indicates time (t) and a vertical axis indicates a signal (s) of the received firing signal.

Figure 5D:
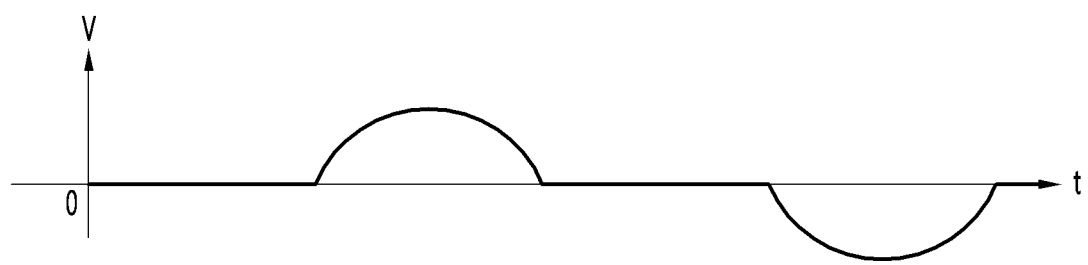
FIG. 5D is a diagram illustrating a voltage (V) applied to the plurality of valves according to an embodiment of an present disclosure.

FIG. 5D may be a diagram illustrating a voltage (V) applied to the plurality of valves 20 when the plurality of valves 20 are turned off, in which a horizontal axis indicates time (t) and a vertical axis indicates a voltage (V).

When the firing signal is not inputted to the plurality of valves 20, the plurality of valves 20 are not turned off. In this case, the voltage (V) may be generated in the plurality of valves 20. When the firing signal is applied to the plurality of valves 20 and the plurality of valves 20 are turned on, the voltage (V) may not be generated in the plurality of valves 20.

Figure 5E:
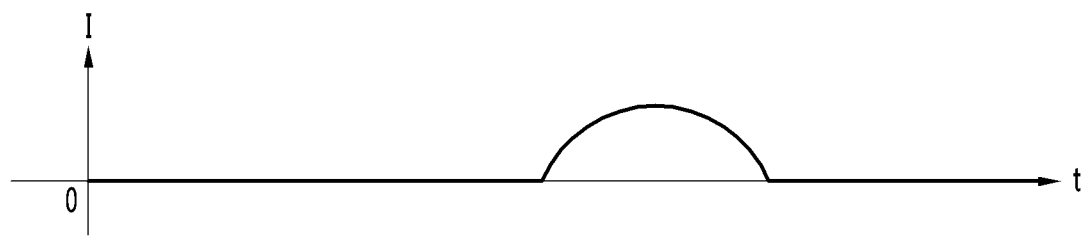
FIG. 5E is a diagram illustrating a current (I) applied to the plurality of valves according to an embodiment of the present disclosure.

FIG. 5E may be a diagram illustrating a current (I) applied to the plurality of valves 20 when the plurality of valves 20 are turned on, in which a horizontal axis indicates time (t) and a vertical axis indicates a current (I).

When the firing signal are not inputted to the plurality of valves 20, the plurality of valves 20 are not turned off. In this case, the current (I) does not flow through the plurality of valves 20, and the firing signal is applied to the plurality of valves 20. When the plurality of valves 20 are turned on, the current (I) may flow through the plurality of valves 20, thus generating an AC current waveform.

Figure 6:
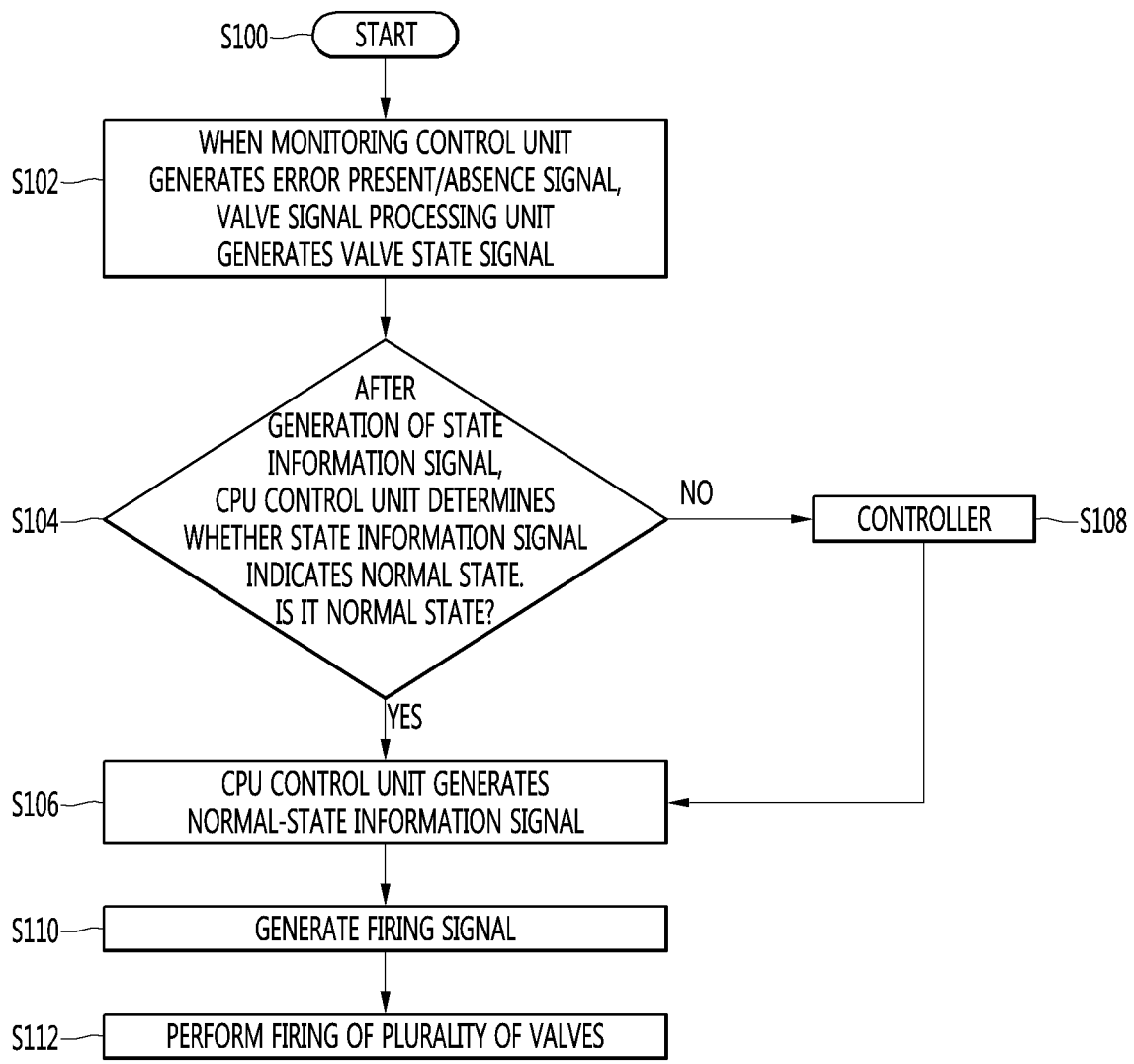
FIG. 6 is a flowchart of a control method for a controller of an SVC according to an embodiment of the present disclosure.

FIG. 6 illustrates a flowchart of a control method for a controller of an SVC, according to an embodiment of the present invention.

According to the control method for the SVC (S100), the monitoring control unit 14 receives a control signal from the system controller 8 and generates an error presence/absence signal and the valve signal processing unit 12 receives databack signals from the plurality of valves 20 respectively and generates valve state signals (S102).

The distributed controller 10 may receive a signal related to the combustion of at least one of the plurality of valves 20, a turn on/off operation of each valve 20, malfunction of the plurality of valves 20, or the like, in addition to the databack signals of the plurality of valves 20. The system controller 8 of the upper controller 100 may receive a signal related to combustion of at least one of the plurality of valves 20, turn on/off operations of the plurality of valves 20, malfunction of at least one of the plurality of valves 20, or the like, in addition to the databack signals of the plurality of valves 20. In this way, the system controller 8 may transmit the control signal to the distributed controller 10 of the valve controller 9. Specifically, the control signal generated by the system controller 8 is inputted to the monitoring control unit 14 of the distributed controller 10 and the databack signals of the plurality of valves 20 may be inputted to the valve signal processing unit 12 of the distributed controller 10.

The monitoring control unit 14 may generate an error presence/absence signal based on the control signal and transmit the error presence/absence signal to the CPU control unit 18. The valve signal processing unit 12 may generate valve state signals based on the databack signals and transmit the valve state signals to the CPU control unit 18.

The CPU control unit 18 may generate a state information signal based on the error presence/absence signal and the valve state signals and determine whether the state information signal indicates a normal state (S104).

When it is determined that the state information signal indicates a normal state, the CPU control unit 18 may transmit a normal-state information signal to the firing signal output control unit 16 (S106).

When the state information signal indicates an abnormal state, the CPU control unit 18 may transmit an abnormal-state information signal to the controller 101. The controller 101 may perform correction of an error related to the abnormal-state information signal and transmit an error correction signal to the CPU control unit 18 (S108). The CPU control unit 18 may generate a normal-state information signal in response to the error correction signal and transmit the normal-state information signal to the firing signal output control unit 16.

Specifically, the CPU control unit 18 may combine the databack signal inputted by the valve signal processing unit 12 and the control signal inputted by the monitoring control unit 14 to generate the state information signal (S104).

The CPU control unit 18 may determine whether the plurality of valves 20 are in a normal state based on the input databack signals and the control signal. The CPU control unit 18 may generate a normal-state information signal when the plurality of valves 20 are in a normal state and generate an abnormal-state information signal when the plurality of valves 20 are in an abnormal state.

When the normal-state information signal is generated (S106), the CPU control unit 18 may transmit the normal-state information signal to the firing signal output control unit 16. When the normal-state information signal is received, the firing signal output control unit 16 may transmit a firing signal to the plurality of valves 20 (S110).

When the abnormal-state information signal is generated, the CPU control unit 18 may transmit the abnormal-state information signal to the controller 101 (S108).

When the abnormal-state information signal is received, the controller 101 may solve an abnormal state-related problem and transmit an error correction signal to the CPU control unit 18.

The CPU control unit 18 may generate a normal-state information signal in response to the error correction signal and transmit the normal-state information signal to the firing signal output control unit 16.

When the normal-state information signal is received from the CPU control unit 18, the firing signal output control unit 16 may generate a firing signal in response to the normal-state information signal and transmit the generated firing signal to the plurality of valves 20 respectively (S110).

The plurality of valves 20 may receive the firing signal and perform firing of at least one of the plurality of valves 20 (S112). The firing may represent an operation of turning on a valve.

The distributed controller 10 may perform firing of a valve by directly transmitting the normal-state information signal to the firing signal output control unit 16, not transmitting the normal-state information signal to the system controller 8.

The control device for the SVC according to the present invention receives the databack signals directly through the valve signal processing unit and performs processing in real time, thus increasing the speed of signal processing.

Also, the control device for the SVC according to the present invention directly transmits the firing signal to the plurality of valves through the firing signal processing unit, thus increasing the speed of signal processing.

Also, the control device for the SVC according to the present invention receives the databack signals of the plurality of valves through the valve signal processing unit and the control signal of the monitoring control unit while identifying the databack signals and the control signal, thus improving reliability of signal processing.

Also, the control device for the SVC according to the present invention identifies a line in which an error occurs based on the databack signals, thus increasing the speed of signal processing.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control device for a static var compensator (SVC) comprising:

a monitoring controller configured to generate an error presence/absence signal based on control signals inputted from a first system controller;

a valve signal processor configured to generate a valve state signal based on databack signals respectively inputted from a plurality of valves, wherein the databack signals are signals comprising current state information for each of the plurality of valves;

a CPU controller configured to generate a state information signal based on the error presence/absence signal and the valve state signal;

a firing signal output controller configured to generate a firing signal according to the state information signal; and a controller configured to correct an error, wherein the control signals are signals of turning on/off the plurality of valves and are inputted from the first system controller during a set period, wherein the monitoring controller checks the number of occurrences of an error during the set period and checks information about a line where the error occurs, wherein the firing signal output controller is further configured to generate the firing signal by:

converting the databack signals into digital signals, performing a logical sum operation, taking all of the digital signals as inputs, to generate a logical sum signal, receiving, at a latch, the logical sum signal and a feedback signal to generate a latched signal, generating a delay signal by delaying the latched signal, performing a first logical product operation, taking all of the control signals as inputs, to generate a first logical product signal, receiving a duplex control signal from a second system controller, performing a second logical product operation on the first logical product signal and the delay signal to generate a second logical product, determining that the second logical product verifies a normal state, and outputting the second logical product signal as the firing signal, and wherein the feedback signal is a previously-calculated state information signal, and wherein the duplex control signal is generated from signals indicating valves which are turned on among the plurality of valves.

2. The control device of claim 1, wherein the state information signal includes information about a normal state or an abnormal state.

3. The control device of claim 2, wherein the monitoring controller periodically initializes the error presence/absence signal.

4. The control device of claim 1, wherein the controller is a central processing unit (CPU).

5. The control device of claim 1, wherein the monitoring controller outputs an error presence signal of the error presence/absence signal to the CPU controller when the control signal is not inputted in the set period.

6. The control device of claim 5, wherein the CPU controller transmits the error presence signal to the controller.

7. The control device of claim 1, wherein the line where the error occurs corresponds to at least one of the databack signals, and
the monitoring controller checks a location of the line where the error occurs through the corresponding databack signal.

8. The control device of claim 1, wherein the CPU controller transmits a normal-state information signal to the firing signal output controller when the state information signal indicates a normal state.

9. The control device of claim 8, wherein the CPU controller transmits an abnormal-state information signal to the controller when the state information indicates an abnormal state.

10. The control device of claim 9, wherein the controller configured to correct an error generates, to correct the error, an error correction signal resulting from error correction based on the abnormal-state information signal and transmits the generated error correction signal to the CPU controller.

11. The control device of claim 10, wherein the CPU controller generates the normal-state information signal in response to the error correction signal and transmits the generated normal-state information signal to the firing signal output controller.

12. The control device of claim 1, further comprising a sub-module interface configured to transmit the databack signals respectively inputted from the plurality of valves to the valve signal processor and transmit a firing signal generated by the output controller to the plurality of valves respectively.

13. A control method of a control device for a static var compensator (SVC), the control method comprising:
generating an error presence/absence signal based on control signals inputted from a first system controller;
generating a valve state signal based on databack signals respectively inputted from a plurality of valves, wherein the databack signals are signals comprising current state information for each of the plurality of valves;
generating a state information signal based on the error presence/absence signal and the valve state signal; and
generating a firing signal according to the state information signal,
wherein the control method further comprises:
receiving the control signals during a set period; and
checking the number of occurrences of an error during the set period and information about a line where the error occurs, and
wherein generating the firing signal further comprises:
converting the databack signals into digital signals,
performing a logical sum operation, taking all of the digital signals as inputs, to generate a logical sum signal,
receiving, at a latch the logical sum signal and a feedback signal to generate a latched signal,
generating a delay signal by delaying the latched signal,
performing a first logical product operation, taking all of the control signals as inputs, to generate a first logical product signal,
receiving a duplex control signal from a second system controller,
performing a second logical product operation on the first logical product signal and the delay signal to generate a second logical product,
determining that the second logical product verifies a normal state, and
outputting the second logical product signal as the firing signal, and
wherein the feedback signal is a previously-calculated state information signal, and
wherein the duplex control signal is generated from signals indicating valves which are turned on among the plurality of valves.

14. The control method of claim 13, wherein the generating of the state information signal comprises:
when the state information signal indicates a normal state, transmitting a normal-state information signal to a firing signal output controller; and
when the state information signal indicates an abnormal state, transmitting an abnormal-state information signal to a controller.

15. The control method of claim 14, wherein the generating of the state information signal further comprises generating, to correct an error, an error correction signal resulting from error correction based on the abnormal-state information signal and transmitting the error correction signal to a CPU controller.

16. The control method of claim 15, wherein the generating of the state information further comprises generating a normal-state information signal in response to the error correction signal and transmitting the generated normal-state information signal to the firing signal output controller.

* * * * *